United States Patent [19]

Keller

[11] 3,994,776

[45] Nov. 30, 1976

[54] NUCLEAR REACTOR INSTALLATION
[75] Inventor: Wolfgang Keller, Erlangen, Germany
[73] Assignee: Siemens Aktiengesellschaft, Munich, Germany
[22] Filed: June 7, 1973
[21] Appl. No.: 367,955

[30] Foreign Application Priority Data
June 15, 1972 Germany............................ 2229287

[52] U.S. Cl................................. 176/38; 176/87
[51] Int. Cl.$^2$ .................... G21C 9/00; G21C 11/02
[58] Field of Search........................ 176/37, 38, 87; 220/9 R, 9 H, 9 B, 15; 106/40; 55/267

[56] References Cited
UNITED STATES PATENTS

| | | | |
|---|---|---|---|
| 1,940,277 | 12/1933 | Stresau ................................ | 220/9 A |
| 2,980,279 | 4/1961 | Lueders ............................... | 220/9 A |
| 3,009,866 | 11/1961 | Fraas .............................. | 176/DIG. 2 |
| 3,010,599 | 11/1961 | Haines ................................ | 220/9 A |
| 3,047,486 | 7/1962 | Hanson ........................... | 176/DIG. 2 |
| 3,159,550 | 12/1964 | Laning ............................ | 176/DIG. 2 |
| 3,322,141 | 5/1967 | Gans, Jr. et al..................... | 176/38 X |

Primary Examiner—Samuel W. Engle
Assistant Examiner—Ralph Palo
Attorney, Agent, or Firm—Kenyon & Kenyon Reilly Carr & Chapin

[57] ABSTRACT

A nuclear reactor installation includes a pressurized-water coolant reactor vessel and a concrete biological shield surrounding this vessel. The shield forms a space between it and the vessel large enough to permit rapid escape of the pressurized-water coolant therefrom in the event the vessel ruptures. Struts extend radially between the vessel and shield for a distance permitting normal radial thermal movement of the vessel, while containing the vessel in the event it ruptures, the struts being interspaced from each other to permit rapid escape of the pressurized-water coolant from the space between the shield and the vessel.

1 Claim, 3 Drawing Figures

NUCLEAR REACTOR INSTALLATION

BACKGROUND OF THE INVENTION

Pressurized-water coolant nuclear reactor installations include the reactor vessel and a biological shield surrounding this vessel. The shield forms a cavity in which the vessel is supported and shields the latter's side wall and bottom. In addition to its biological function, the shield functions to contain the vessel in the event it ruptures, thus indicating that the biological shield should surround the vessel as closely as possible, leaving a space only for the normal thermal movement of the vessel.

However, if this minimum space between the shield and vessel is used, there is inadequate upward conduit space for the rapid release of the vessel's pressurized-water coolant in the event the vessel ruptures. In addition, such a small space does not leave enough room for the insertion of instruments between the shield and vessel for the purpose of inspecting the condition of the vessel's wall. It is to be understood that the pressure vessel is designed with a wide margin of safety. However, nuclear reactor installations must meet extremely severe demands concerning safety. The maximum hypothetical accident must be considered at all times.

SUMMARY OF THE INVENTION

An object of the present invention is to provide an installation permitting the reactor pressure vessel to be adequately contained in the event it ruptures while at the same time providing for a very rapid escape for the pressurized-water coolant in the event of such an accident and also providing for the insertion of instruments in a space between the vessel for the purpose of inspecting the condition of the vessel's wall.

According to the invention, this object is attained by making the space between the shield and vessel large enough to permit the rapid escape of the pressurized-water coolant therefrom in the event the vessel ruptures. This space should be large enough to permit the escape of the coolant rapidly enough to prevent it from exerting an unsafe upward force on the vessel tending to project it from the biological shield cavity in which the vessel is positioned.

Within the above space struts extend radially between the vessel and shield for a distance permitting normal radial thermal movement of the vessel while containing the latter safely in the event it ruptures. The struts are interspaced to permit the escape of the coolant. With this installation the struts contain the vessel to the extent of resisting its outward expansion. It, of course, prevents parts of the casing from flying about within the biological shield cavity.

The term "struts" is used in the sense that the elements involved operate in compression as struts to transfer outwardly directed forces exerted by the vessel or parts of the vessel to the biological shield cavity, the biological shield being made of reinforced concrete and having very thick walls.

These struts are in the form of ribs extending longitudinally with respect to the vessel and which are preferably connected to the biological shield and have radially inward surfaces spaced from the vessel. The ribs may extend longitudinally for the full extent of the vessel or they may be formed by longitudinally extending portions of less length than the vessel but which collectively surround the entire vessel. These rib portions may be offset from each other circumferentially with respect to the vessel or they may be formed in each instance as a series of mutually aligned ribs.

In any event, it is preferable that the struts or ribs be positioned relative to each other to define one or more passages extending in the space between the shield and vessel longitudinally with respect to the latter and for substantially the latter's length, with these passages proportioned to permit the insertion of an instrument for determining the vessel's condition.

A thermal insulation layer may be positioned between the struts in the space between the shield and cavity with this layer in radially spaced relationship to both the vessel and the biological shield cavity. In this way inner and outer spaces are formed through which a cooling fluid, particularly air, may be passed so that in conjunction with the thermal insulating layer the thermal load that would otherwise be imposed on the biological shield is substantially reduced.

The preferable form of the ribs is to make them of superimposed metal and thermal insulating material parts, respectively, disposed to transmit through them the expansive force possibly exerted by the vessel or its parts, to the biological shield. These parts may be confined by metal webs preventing displacement of the parts relative to each other particularly when suddenly stressed. The thermal insulating part may be made of a ceramic material with the metal part adjacent to the vessel and spaced therefrom, with a metal plate connected to the biological shield and against which the ceramic part is supported, this ceramic part thereby being enclosed by this plate, by the webs and by the metal part between it and the vessel. The webs, which may be the webs of two channel bars between which the metal and ceramic parts are held, are of relatively small cross sectional area, and, therefore, forming relatively poor thermal conducting paths. The metal part between the ceramic part and the vessel may be of relatively massive construction because the ceramic part is between it and the metal plate fixed to the biological shield. Because the ceramic part is surrounded by metal parts, it is capable of sustaining great compressive shock in spite of its ceramic characteristics.

BRIEF DESCRIPTION OF THE DRAWINGS

The accompanying drawings in a partially schematic manner illustrate a preferred embodiment of the invention, the various figures being as follows.

DESCRIPTION OF THE PREFERRED EMBODIMENT

Figure 1:
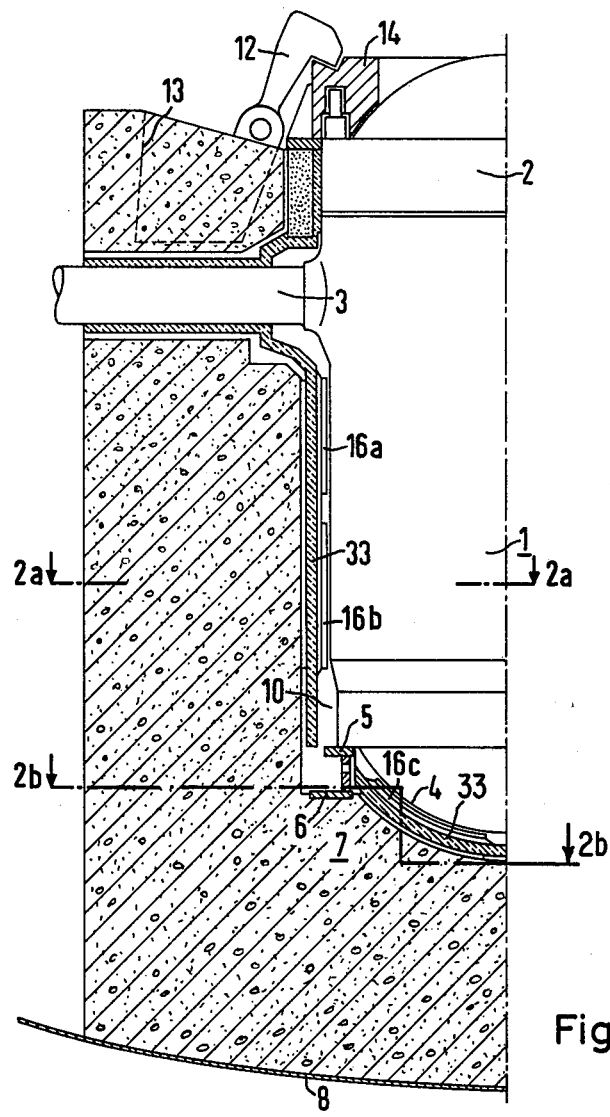
FIG. 1 is a vertical section showing half of an installation embodying the invention, the other half being the same and, therefore, not requiring illustration.

Having reference to the above drawings, the substantially cylindrical pressurized-water coolant reactor pressure vessel 1, which is made of steel, has a steel lid 2 below which a series of circumferentially interspaced coolant connections 3 radially extend. The pressure vessel has a hemispherical bottom 4 and is supported on a support ring 5 resting on an annular steel pedestal supported by an annular shelf formed by the reinforced concrete biological shield 7, the entire nuclear reactor installation being enclosed in an outer safety envelope 8 made of steel. The biological shield 7 is defined by very thick walls and the cavity it forms and in which the vessel 1 is positioned, results in the shield enclosing the side wall and bottom of the vessel. The space 10 or gap formed between the shield and vessel is large enough to provide for the rapid escape of the pressurized-water coolant, should this become necessary, to permit the insertion of instruments for inspecting and, incidentally, to provide a passage permitting air cooling reducing the thermal stress or load on the concrete of the shield. This space may, for example, equal approximately one-sixth of the outside diameter of the reactor pressure vessel.

The vessel's lid 2, and therefore the vessel itself, is held down by an intercept ring. For this purpose steel hooks 12 connect with steel anchors 13 embedded in the concrete of the biological shield, and extend over and engage the intercept ring 14, the latter overlapping the periphery of the lid 2. This arrangement is adequate to prevent the pressure vessel from being driven upwardly from the biological shield cavity in the event of accidental release of the coolant within the cavity, because the size of the space 10 is adequate to permit the rapid escape of the coolant upwardly.

The strutting ribs 16 are uniformly distributed throughout the circumference and length of the pressure vessel 1. These ribs extend radially for a distance permitting normal thermal movement of the vessel's wall while providing for safe containment of the latter in the event of an accidental rupture. The ribs extend vertically and are parallel to each other and, of course, to the longitudinal axis of the vessel 1. The ribs may be of less length than the vessel and used in end-to-end relationship as indicated at 16a and 16b in FIG. 1. The ribs may be continued as at 16c around the bottom 4 of the vessel, these ribs being curved to fit the hemispherical bottom container.

The ribs 16 preferably bridge or span the distance between the shield 7 and the vessel 1 for more than nine-tenths of the extent of the space previously referred to. The remainder of the space, shown at 11 in FIG. 3, may be only about 15% of the wall thickness of the pressure vessel. Ordinarily this space 11 is only required to be large enough to permit the normal thermal movement of the pressure vessel's wall so that if the latter fails there is the most possible effective containment of the vessel.

Figure 3:
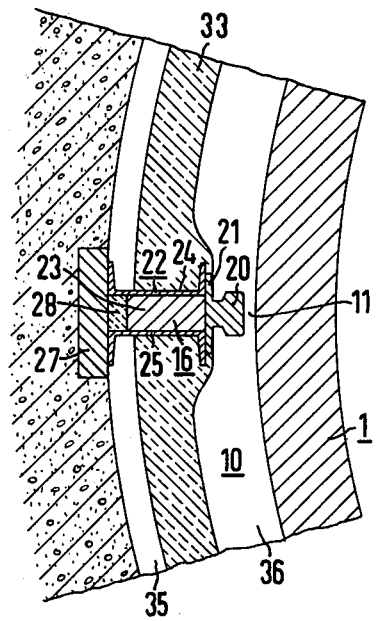
FIG. 3 is an enlargement taken from FIG. 2.
Figure 2:
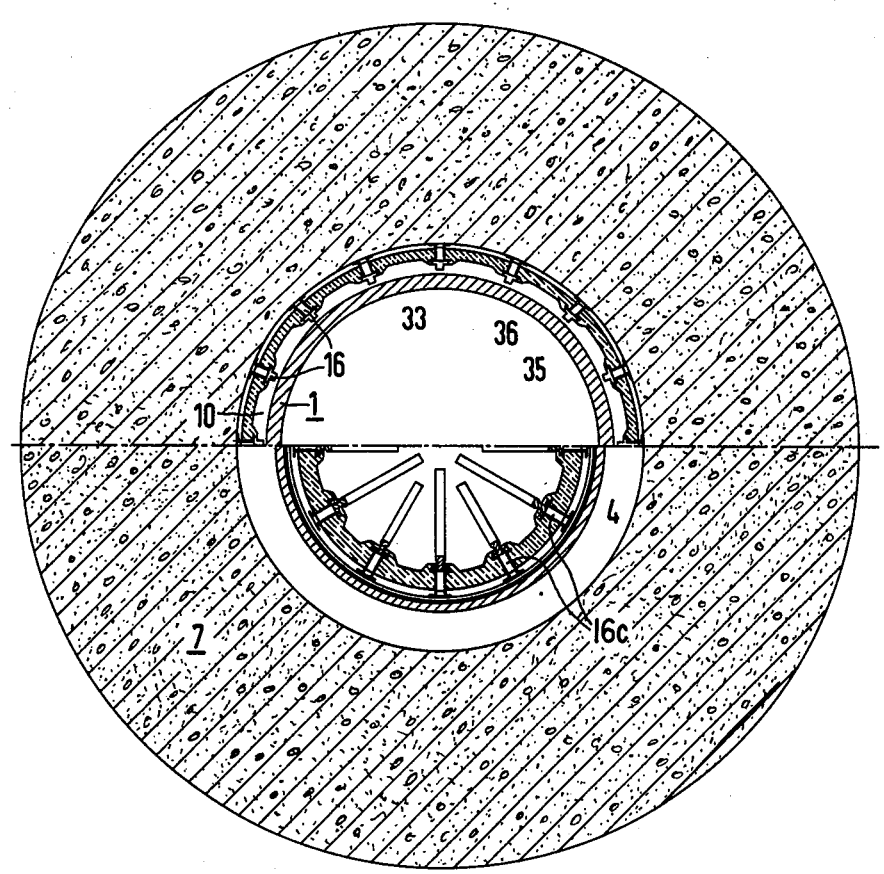
FIG. 2 is a composite cross section, the upper half being taken on the line 2a—2a and the lower half being taken on the line 2b—2b, both in FIG. 1.

All of the ribs may be constructed in the same manner. As shown by FIG. 3, in particular, each rib comprises a bar 20 having somewhat the contour of a railroad rail, and is supported on a composite beam 22. This beam comprises a relatively massive steel section 23 of rectangular cross section and two identical steel channel bars 24 and 25 having their webs holding the part 23 between them and with their flanges extending outwardly. Adjacent to the vessel 1 the channel bar flanges and the steel section 23 support the rail-like section 20, the other flanges of these two bars 24 and 25 being connected to a steel plate 27 embedded in the concrete of the shield 7. Between the section 23 and the plate 27 a ceramic part 28 is positioned to substantially reduce the thermal conductivity of the composite rib or strut.

The webs of the channel bars do not provide paths of high thermal conductivity to the same degree as does the relatively massive section or bar 23, the ceramic member 28, which is in the form of a rectangular shape interrupting the path of high thermal conductivity which would otherwise be provided by the large section 23. Because this ceramic part 28 is supported on all sides by steel it is capable of carrying higher compressive forces than it would be otherwise.

In this particular embodiment, sixteen ribs extending vertically and circumferentially interspaced surround the outside of the pressure vessel 1. They extend either integrally or preferably as sections for the entire length of the reactor from the latter's coolant connections 3 downwardly and around its bottom. They resist excessive expansion of the vessel as a whole as well as confining fragments such as might result from a maximum hypothetical accident.

A layer of thermal insulation 33, such as aluminum foil, is interspaced between the vessel 1 and the wall of the biological shield cavity. This layer extends from one of the ribs to the other and is thickened adjacent each rib to provide for firm engagements with the ribs. As shown by FIG. 3, this layer 33 defines two spaces or chambers 35 and 36 on its opposite sides and through which different flows of cooling air can be passed. If desired, the cooling air may be passed through the space or chamber 35 and then through the other space or chamber 36, or vice versa.

Because of the size of the space or gap 10, this layer of thermal insulation 33 does not interfere with the rapid escape of the pressurized-water coolant should this be required. Also, the space 36 remains large enough for the insertion of instruments for detecting the condition of the pressure vessel's wall. It is to be understood that the various ribs should not be interpositioned in such a fashion as to prevent the insertion of an instrument and its access to the wall of the pressure vessel. However, in some instances the ribs may be arranged diagonally to some extent.

What is claimed is:

1. A nuclear reactor installation including a pressurized-water coolant reactor pressure vessel and a biological shield surrounding said vessel; wherein the improvement comprises said shield forming a space between it and said vessel large enough to permit rapid escape of the pressurized-water coolant therefrom in the event said vessel ruptures, and struts extending radially between said vessel and shield for a distance permitting normal radial thermal movement of said vessel while containing the latter in the event it ruptures, said struts being interspaced to permit said escape, said struts comprising superimposed metal and solid thermal insulating material parts disposed to transmit expansion force exerted by said vessel, to said biological shield, said parts being confined between metal webs preventing displacement of the parts relative to each other, and as to each of said struts, said thermal insulation material part is a ceramic part, said metal part is adjacent to said vessel and spaced therefrom and a metal plate is connected to said biological shield and said ceramic part is supported thereby and enclosed by said plate, webs and metal part.

* * * * *